Patented June 5, 1934

1,961,898

UNITED STATES PATENT OFFICE 1,961,898

METHOD OF REFINING OIL

Hiram W. Camp, Tulsa, Okla., assignor to Empire Oil and Refining Company, New York, N. Y., a corporation of Delaware No Drawing. Application August 17, 1932, Serial No. 629,127

6 Claims. (Cl. 196—147)

This invention relates to an improved process for refining lubricating oil stock to improve its color.

Certain lubricating oil stocks which are derived from petroleum by distillation have a blue cast or bloom which may have no deleterious effect on the lubricating properties of the oil, but which nevertheless adversely affects the marketable value of the oil. Oil stocks having this undesirable blue cast or bloom normally carry in solution compounds capable of imparting to the oil a green fluorescence which is regarded by the trade as a mark of quality. The undesirable blue cast, however, apparently dominates or obscures the green fluorescence inherently present in such oil, so that it becomes necessary to refine the oil to remove impurities apparently imparting the blue cast or bloom in order to develop the green fluorescence.

The principal object of the present invention is therefore to provide an improved process of treating oil having an undesirable bloom to develop therein a desirable green fluorescence when viewed in reflected light.

Broadly, the process of the present invention, as herein described and more particularly defined in the claims, consists in contacting oil having an undesirable bloom, at an elevated and controlled temperature and for a regulated contact period, with finely divided high volatile petroleum coke in amount sufficient to remove the undesirable bloom and develop the desired color characteristics. In practicing the invention, lubricating oil stock, preferably acid treated bright stock obtained as an overhead distillate, is contacted simultaneously with decolorizing clay and with finely divided (under one quarter inch size) pressure cracking still coke. The period of contact of the bright stock with the solid contact or filtering mixture of clay and coke is of course determined by the degree of activation and concentration of the coke in the contact mixture, and by the relative degree of color change which it is desired to develop in the particular oil under treatment.

An important feature of the process resides in the characteristics of the coke filtering medium employed. It has been determined that successful results apparently require the use of a finely divided cracking still coke of friable structure having the following approximate composition:

Ash and sulphur under 1%
Fixed carbon 80% to 90%
Volatile matter (exclusive of moisture) 10 to 20%

The contacting of the oil with the cracking still coke for the necessary contact period may be effected either by percolation (filtering of the oil through a filtering bed of the coke) or by agitation of the oil with finely divided coke and clay in the ratio of about 10–20% by weight of the oil treated, followed by separation of the solid and liquid constituents of the contact mixture in a filter press.

As an example of the process, an overhead bright stock distillate derived from Mid-Continent petroleum and having a blue bloom was simultaneously clarified and the undesirable blue cast removed leaving the stock a desirable green color, by contact agitation of the stock in the liquid phase with a finely divided (200 mesh) substantially equally proportioned mixture of decolorizing clay and 18% volatile cracking still coke, at a temperature of 400° F., followed by separation of the oil from the filtering medium in a conventional filter press. In this treatment about 40 to 60 pounds of mixed coke and clay were used for each barrel of oil treated, and the contact period was about 10 minutes. The bright stock treated in this manner and after dewaxing and dehydration was found to meet the No. 6 N. P. A. color specifications and to have a 150 to 160 viscosity and a zero to 5° F. cold test.

The clay is not effective in removing the objectionable bloom from the oil, while the coke is very effective in developing the desired color in an oil which, prior to the treatment, has its desirable color characteristics obscured by the undesirable blue cast. It will be appreciated, therefore, that the invention is applicable to the treatment of any type of oil having an undesirable color cast obscuring desirable color characteristics.

The invention having been thus described both generally and by way of example, what is claimed as new is:

1. The process of treating an oil having an undesirable bloom for the purpose of developing desirable color characteristics therein, comprising intimately contacting the oil at an elevated temperature with finely divided cracking still coke of 10 to 20% volatile and 80 to 90% fixed carbon content.

2. The process of treating a lubricating oil having an undesirable bloom for the purpose of developing a green fluorescence therein, comprising intimately contacting the stock at a temperature of about 400° F. with finely divided cracking still coke of 10 to 20% volatile content.

3. The process of treating a petroleum lubricating oil distillate having an undesirable bloom to produce a bright stock of desired viscosity, cold test, and color characteristics, comprising intimately contacting said distillate for several minutes with finely pulverized cracking still coke containing 80% to 90% fixed carbon and 10% to 20% volatile, and separating the oil and coke.

4. In treating petroleum lubricant bright stock to develop therein desirable color characteristics, the improvement comprising intimately contacting bright stock in the liquid phase with 10% to 20% by weight of a mixture of finely divided decolorizing clay and high volatile cracking still coke at a temperature of about 400° F. for a period of several minutes, and thereafter separating the solid and liquid components of the contact mixture.

5. The process of refining a petroleum oil lubricant having an undesirable blue bloom, which comprises contacting the oil with a friable petroleum coke having a volatile content of at least 10% whereby said oil is freed of said blue bloom.

6. The process of refining a petroleum lubricating oil having a blue bloom, which comprises contacting the said oil with a mixture of decolorizing clay and a petroleum coke having at least 10% volatile content whereby the said blue bloom is removed from said oil.

HIRAM W. CAMP.